United States Patent
Farandos et al.

(10) Patent No.: US 12,460,306 B2
(45) Date of Patent: *Nov. 4, 2025

(54) PRODUCTION OF HYDROGEN VIA ELECTROCHEMICAL REFORMING

(71) Applicant: Utility Global, Inc., Houston, TX (US)

(72) Inventors: Nicholas Farandos, Bray (IE); Matthew Dawson, Katy, TX (US); Jin Dawson, Katy, TX (US)

(73) Assignee: Utility Global, Inc., Houston, TX (US)

( * ) Notice: Subject to any disclaimer, the term of this patent is extended or adjusted under 35 U.S.C. 154(b) by 785 days.

This patent is subject to a terminal disclaimer.

(21) Appl. No.: 17/848,183

(22) Filed: Jun. 23, 2022

(65) Prior Publication Data

US 2023/0020427 A1    Jan. 19, 2023

Related U.S. Application Data

(60) Provisional application No. 63/218,086, filed on Jul. 2, 2021.

(51) Int. Cl.
*C25B 9/23* (2021.01)
*C25B 1/02* (2006.01)
(Continued)

(52) U.S. Cl.
CPC .............. *C25B 9/23* (2021.01); *C25B 1/02* (2013.01); *C25B 9/015* (2021.01); *C25B 11/031* (2021.01); *C25B 11/04* (2013.01); *C25B 13/07* (2021.01)

(58) Field of Classification Search
CPC .............. C25B 9/23; C25B 13/07; C25B 1/23
See application file for complete search history.

(56) References Cited

U.S. PATENT DOCUMENTS

2003/0218991 A1    11/2003  Besecker et al.
2007/0011048 A1     1/2007  Naito
(Continued)

FOREIGN PATENT DOCUMENTS

KR    101392828 B1 *  5/2014  ............. C25B 13/04
WO    WO-03/089117 A1   10/2003
(Continued)

OTHER PUBLICATIONS

International Search Report and Written Opinion for PCT/US2022/034762, mailed Oct. 24, 2022, 11 pages.

*Primary Examiner* — Ciel P Contreras
(74) *Attorney, Agent, or Firm* — Foley & Lardner LLP

(57) ABSTRACT

Herein discussed is an electrochemical reactor comprising a mixed-conducting membrane, wherein the membrane comprises an electronically conducting phase and an ionically conducting phase, wherein the reactor is capable of reforming a hydrocarbon electrochemically, wherein the electrochemical reforming reactions involve the exchange of an ion through the membrane to oxidize the hydrocarbon. Further discussed herein is a method of producing hydrogen comprising providing an electrochemical (EC) reactor having a mixed-conducting membrane, introducing a first stream comprising a hydrocarbon to the reactor, introducing a second stream comprising water to the reactor, and reducing the water in the second stream to produce hydrogen, wherein the first stream and the second stream do not come in contact with each other in the reactor, and wherein the hydrocarbon is reformed electrochemically in the EC reactor.

17 Claims, 3 Drawing Sheets

(51) Int. Cl.
 *C25B 9/015* (2021.01)
 *C25B 11/031* (2021.01)
 *C25B 11/04* (2021.01)
 *C25B 13/07* (2021.01)

(56) References Cited

U.S. PATENT DOCUMENTS

| | | |
|---|---|---|
| 2007/0111048 A1 | 5/2007 | Boersma et al. |
| 2011/0143038 A1* | 6/2011 | Bone ................ C04B 41/89 |
| | | 427/380 |
| 2012/0171587 A1 | 7/2012 | Shindle et al. |
| 2017/0247803 A1 | 8/2017 | Sofranko |
| 2020/0140297 A1 | 5/2020 | Hall et al. |
| 2020/0144627 A1 | 5/2020 | Hall et al. |
| 2020/0144628 A1 | 5/2020 | Hall et al. |
| 2020/0144633 A1 | 5/2020 | Hall et al. |
| 2020/0144635 A1 | 5/2020 | Hall et al. |
| 2020/0144646 A1 | 5/2020 | Hall et al. |
| 2020/0144647 A1 | 5/2020 | Hall et al. |
| 2020/0144648 A1 | 5/2020 | Hall et al. |
| 2020/0144653 A1 | 5/2020 | Hall et al. |
| 2020/0144654 A1 | 5/2020 | Hall et al. |
| 2020/0156104 A1 | 5/2020 | Hall et al. |
| 2020/0176803 A1 | 6/2020 | Hall et al. |
| 2020/0182549 A1 | 6/2020 | Hall et al. |
| 2020/0227763 A1 | 7/2020 | Hall et al. |
| 2020/0235409 A1 | 7/2020 | Hall et al. |
| 2020/0235410 A1 | 7/2020 | Hall et al. |
| 2020/0255959 A1 | 8/2020 | Hall et al. |
| 2020/0255962 A1 | 8/2020 | Hall et al. |
| 2020/0255963 A1 | 8/2020 | Dawson et al. |
| 2020/0259186 A1 | 8/2020 | Hall et al. |
| 2020/0303749 A1 | 9/2020 | Hall et al. |
| 2021/0024425 A1 | 1/2021 | Dawson et al. |
| 2021/0069786 A1 | 3/2021 | Hall et al. |
| 2021/0121978 A1 | 4/2021 | Dawson et al. |
| 2021/0175531 A1 | 6/2021 | Farandos et al. |
| 2022/0364245 A1 | 11/2022 | Farandos et al. |
| 2022/0364251 A1 | 11/2022 | Dawson et al. |
| 2022/0372635 A1 | 11/2022 | Farandos et al. |
| 2022/0380210 A1 | 12/2022 | Farandos et al. |
| 2022/0403532 A1 | 12/2022 | Farandos et al. |
| 2023/0002915 A1 | 1/2023 | Dawson et al. |
| 2023/0013911 A1 | 1/2023 | Dawson et al. |
| 2023/0092683 A1 | 3/2023 | Farandos et al. |
| 2023/0109683 A1 | 4/2023 | Dawson et al. |
| 2023/0167560 A1 | 6/2023 | Dawson et al. |
| 2023/0175143 A1 | 6/2023 | Farandos et al. |
| 2024/0133052 A1 | 4/2024 | Matthews et al. |
| 2024/0133062 A1 | 4/2024 | Dawson et al. |
| 2024/0167169 A1 | 5/2024 | Dawson et al. |
| 2024/0200210 A1 | 6/2024 | Dawson |
| 2024/0209530 A1 | 6/2024 | Dawson et al. |
| 2024/0229253 A9 | 7/2024 | Matthews et al. |
| 2024/0287688 A1 | 8/2024 | Dawson et al. |
| 2024/0287689 A1 | 8/2024 | Dawson et al. |
| 2024/0417867 A1 | 12/2024 | Dawson et al. |
| 2024/0417869 A1 | 12/2024 | Dawson et al. |
| 2025/0011945 A1 | 1/2025 | Dawson et al. |
| 2025/0146147 A1 | 5/2025 | Dawson |
| 2025/0236962 A1 | 7/2025 | Dawson et al. |

FOREIGN PATENT DOCUMENTS

| | | | |
|---|---|---|---|
| WO | WO-2007/011401 A2 | 1/2007 | |
| WO | WO-2007/086949 A2 | 8/2007 | |
| WO | WO-2015169786 A1 * | 11/2015 | ............ B22F 1/0547 |
| WO | WO-2020/146762 A1 | 7/2020 | |
| WO | WO-2022/271588 A1 | 12/2022 | |

* cited by examiner

PRODUCTION OF HYDROGEN VIA ELECTROCHEMICAL REFORMING

CROSS-REFERENCE TO RELATED APPLICATIONS

This application claims the benefit under 35 U.S.C. 119(e) of U.S. Provisional Patent Application No. 63/218,086 filed Jul. 2, 2021, the entire disclosure of which is hereby incorporated herein by reference.

TECHNICAL FIELD

This invention generally relates to hydrogen production. More specifically, this invention relates to an electrochemical hydrogen production method and system.

BACKGROUND

Hydrogen in large quantities is needed in the petroleum and chemical industries. For example, large amounts of hydrogen are used in upgrading fossil fuels and in the production of ammonia or methanol or hydrochloric acid. Petrochemical plants need hydrogen for hydrocracking, hydrodesulfurization, hydrodealkylation. Hydrogenation processes to increase the level of saturation of unsaturated fats and oils also need hydrogen. Hydrogen is also a reducing agent of metallic ores. Hydrogen may be produced from electrolysis of water, steam reforming, lab-scale metal-acid process, thermochemical methods, or anaerobic corrosion. Many countries are aiming at a hydrogen economy.

Clearly there is increasing need and interest to develop new technological platforms to produce hydrogen. This disclosure discusses hydrogen production using efficient electrochemical pathways. The electrochemical reactor and the method to perform such reactions are discussed.

SUMMARY

Herein discussed is an electrochemical reactor comprising a mixed-conducting membrane, wherein the membrane comprises an electronically conducting phase and an ionically conducting phase, wherein the reactor is capable of reforming a hydrocarbon electrochemically, wherein the electrochemical reforming reactions involve the exchange of an ion through the membrane to oxidize the hydrocarbon.

In an embodiment, the reactor comprises a porous anode and a porous cathode that comprise metallic phase and ceramic phase, wherein the metallic phase is electronically conductive, and wherein the ceramic phase is ionically conductive. In an embodiment, the anode and the cathode have no current collector attached. In an embodiment, the anode and the cathode are separated by the membrane and are both exposed to a reducing environment.

In an embodiment, the anode or the cathode comprises Ni or NiO and a material selected from the group consisting of YSZ, 8YSZ, CGO, CoCGO, SDC, SSZ, LSGM, and combinations thereof. In an embodiment, the anode comprises doped or undoped ceria and a material selected from the group consisting of Cu, CuO, $Cu_2O$, Ag, $Ag_2O$, Au, $Au_2O$, $Au_2O_3$, Pt, Pd, Ru, Rh, Ir, LaCaCr, LaSrCrFe, YSZ, CGO, SDC, SSZ, LSGM, stainless steel, and combinations thereof.

In an embodiment, the anode comprises lanthanum chromite and a material selected from the group consisting of doped ceria, yttria-stabilized zirconia (YSZ), lanthanum strontium gallate magnesite (LSGM), scandia-stabilized zirconia (SSZ), Sc and Ce doped zirconia, and combinations thereof. In an embodiment, the lanthanum chromite comprises undoped lanthanum chromite, strontium doped lanthanum chromite, iron doped lanthanum chromite, strontium and iron doped lanthanum chromite, lanthanum calcium chromite, or combinations thereof.

In an embodiment, the electrochemical reforming reactions comprise electrochemical half-cell reactions, wherein the half-cell reactions are:

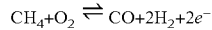

a)

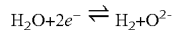

b)

In an embodiment, the half-cell reactions take place at triple phase boundaries, wherein the triple phase boundaries are the intersections of pores with the electronically conducting phase and the ionically conducting phase.

In an embodiment, the electronically conducting phase comprises doped lanthanum chromite or an electronically conductive metal or combination thereof; and the ionically conducting phase comprises a material selected from the group consisting of gadolinium or samarium doped ceria, yttria-stabilized zirconia (YSZ), lanthanum strontium gallate magnesite (LSGM), scandia-stabilized zirconia (SSZ), Sc and Ce doped zirconia, and combinations thereof.

In an embodiment, the membrane comprises CoCGO or LST (lanthanum-doped strontium titanate)-stabilized zirconia. In an embodiment, the stabilized zirconia comprises YSZ or SSZ or SCZ (scandia-ceria-stabilized zirconia).

Also discussed herein is a reactor comprising: an anode and a mixed conducting membrane; wherein the anode and the mixed conducting membrane are in contact with each other, wherein the membrane comprises an electronically conducting phase and an ionically conducting phase, and wherein the anode promotes electrochemical hydrocarbon reforming reactions.

In an embodiment, the anode is exposed to a reducing environment and the electrochemical reaction taking place in the anode is oxidation. In an embodiment, the reactor comprises no interconnect.

Further discussed herein is a method of producing hydrogen comprising providing an electrochemical (EC) reactor having a mixed-conducting membrane, introducing a first stream comprising a hydrocarbon to the reactor, introducing a second stream comprising water to the reactor, and reducing the water in the second stream to produce hydrogen, wherein the first stream and the second stream do not come in contact with each other in the reactor, and wherein the hydrocarbon is reformed electrochemically in the EC reactor. In an embodiment, the reduction from water to hydrogen takes place electrochemically. In an embodiment, the first stream consists essentially of a hydrocarbon and hydrogen. In an embodiment, the reactor does not generate electricity and does not need electricity input.

Further aspects and embodiments are provided in the following drawings, detailed description, and claims. Unless specified otherwise, the features as described herein are combinable and all such combinations are within the scope of this disclosure.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Overview

Figure 1:
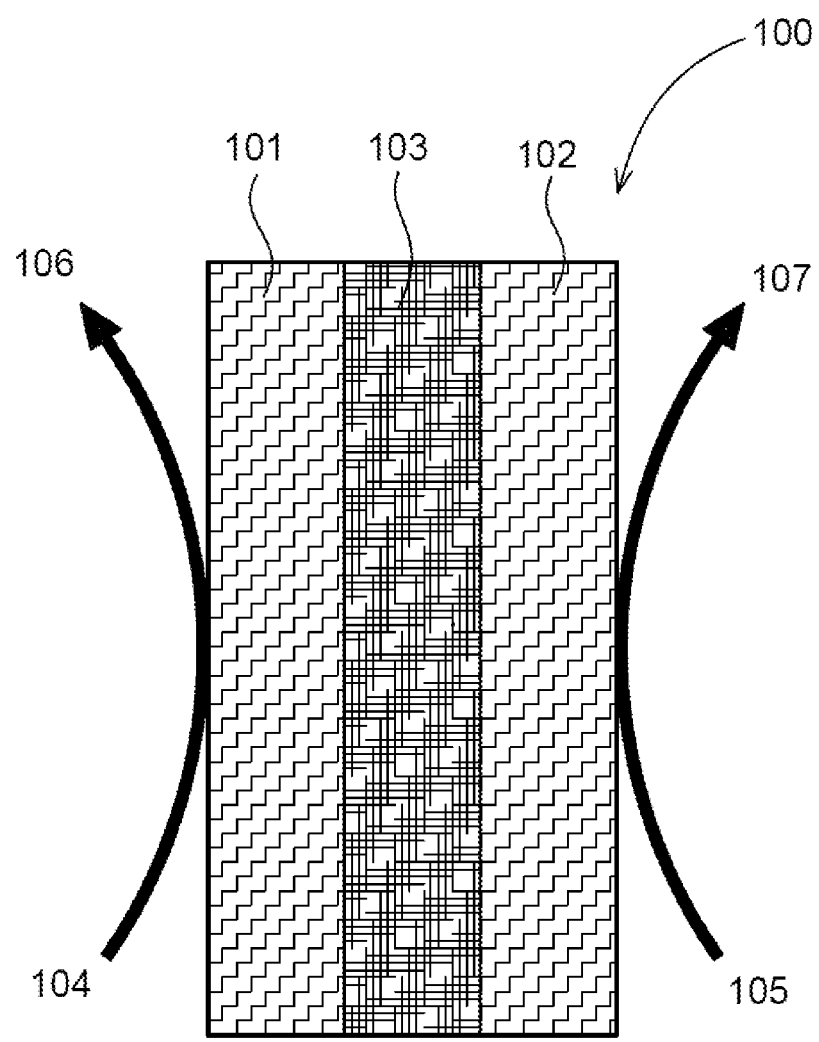
FIG. 1 illustrates an electrochemical (EC) reactor or an electrochemical gas producer, according to an embodiment of this disclosure.

The disclosure herein describes an electrochemical hydrogen production method and system. The method and system of this disclosure produce hydrogen via electrochemical reforming or electrochemical water gas shift (WGS) reactions. The oxygen/oxide needed for such reforming or WGS reactions derives from the reduction of water, and it is supplied across a membrane.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like. As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, compositions and materials are used interchangeably unless otherwise specified. Each composition/material may have multiple elements, phases, and components. Heating as used herein refers to actively adding energy to the compositions or materials.

As used herein, YSZ refers to yttria-stabilized zirconia; SDC refers to samaria-doped ceria; SSZ refers to scandia-stabilized zirconia; LSGM refers to lanthanum strontium gallate magnesite.

In this disclosure, no substantial amount of $H_2$ means that the volume content of the hydrogen is no greater than 5%, or no greater than 3%, or no greater than 2%, or no greater than 1%, or no greater than 0.5%, or no greater than 0.1%, or no greater than 0.05%.

As used herein, CGO refers to Gadolinium-Doped Ceria, also known alternatively as gadolinia-doped ceria, gadolinium-doped cerium oxide, cerium(IV) oxide, gadolinium-doped, GDC, or GCO, (formula $Gd:CeO_2$). CGO and GDC are used interchangeably unless otherwise specified. Syngas (i.e., synthesis gas) in this disclosure refers to a mixture consisting primarily of hydrogen, carbon monoxide and carbon dioxide.

A mixed conducting membrane is able to transport both electrons and ions. Ionic conductivity includes ionic species such as oxygen ions (or oxide ions), protons, halogenide anions, chalcogenide anions. In various embodiment, the mixed conducting membrane of this disclosure comprises an electronically conducting phase and an ionically conducting phase.

In this disclosure, the axial cross section of the tubulars is shown to be circular, which is illustrative only and not limiting. The axial cross section of the tubulars is any suitable shape as known to one skilled in the art, such as square, square with rounded corners, rectangle, rectangle with rounded corners, triangle, hexagon, pentagon, oval, irregular shape, etc.

As used herein, ceria refers to cerium oxide, also known as ceric oxide, ceric dioxide, or cerium dioxide, is an oxide of the rare-earth metal cerium. Doped ceria refers to ceria doped with other elements, such as samaria-doped ceria (SDC), or gadolinium-doped ceria (GDC or CGO). As used herein, chromite refers to chromium oxides, which includes all the oxidation states of chromium oxides.

A layer or substance being impermeable as used herein refers to it being impermeable to fluid flow. For example, an impermeable layer or substance has a permeability of less than 1 micro darcy, or less than 1 nano darcy.

In this disclosure, sintering refers to a process to form a solid mass of material by heat or pressure, or a combination thereof, without melting the material to the extent of liquefaction. For example, material particles are coalesced into a solid or porous mass by being heated, wherein atoms in the material particles diffuse across the boundaries of the particles, causing the particles to fuse together and form one solid piece.

Electrochemistry is the branch of physical chemistry concerned with the relationship between electrical potential, as a measurable and quantitative phenomenon, and identifiable chemical change, with either electrical potential as an outcome of a particular chemical change, or vice versa. These reactions involve electrons moving between electrodes via an electronically-conducting phase (typically, but not necessarily, an external electrical circuit), separated by an ionically-conducting and electronically insulating membrane (or ionic species in a solution). When a chemical reaction is effected by a potential difference, as in electrolysis, or if electrical potential results from a chemical reaction as in a battery or fuel cell, it is called an electrochemical reaction. Unlike chemical reactions, in electrochemical reactions electrons (and necessarily resulting ions), are not transferred directly between molecules, but via the aforementioned electronically conducting and ionically conducting circuits, respectively. This phenomenon is what distinguishes an electrochemical reaction from a chemical reaction.

Related to the electrochemical water gas shift (WGS) reactor and methods of use, various components of the reactor are described such as electrodes and membranes along with materials of construction of the components. The following description recites various aspects and embodiments of the inventions disclosed herein. No particular embodiment is intended to define the scope of the invention. Rather, the embodiments provide non-limiting examples of various compositions and methods that are included within the scope of the claimed inventions. The description is to be read from the perspective of one of ordinary skill in the art.

Therefore, information that is well-known to the ordinarily skilled artisan is not necessarily included.

Herein discussed is an electrochemical reactor comprising an ionically conducting membrane, wherein the reactor is capable of reforming a hydrocarbon electrochemically, wherein the electrochemical reforming reactions involve the exchange of an ion through the membrane to oxidize the hydrocarbon. In an embodiment, the reactor comprises porous electrodes that comprise metallic phase and ceramic phase, wherein the metallic phase is electronically conductive, and wherein the ceramic phase is ionically conductive. In an embodiment, the electrodes have no current collector attached. In an embodiment, the electrodes are separated by the membrane and are both exposed to a reducing environment.

In an embodiment, one of the electrodes comprises Ni or NiO and a material selected from the group consisting of YSZ, 8YSZ, CoCGO, CGO, SDC, SSZ, LSGM, and combinations thereof. For example, the anode and the cathode are made of Ni-CoCGO, Ni-CGO, Ni-YSZ, or Ni-8YSZ. In an embodiment, one of the electrodes comprises doped or undoped ceria and a material selected from the group consisting of Cu, CuO, Cu$_2$O, Ag, Ag$_2$O, Au, Au$_2$O, Au$_2$O$_3$, Pt, Pd, Ru, Rh, Ir, LaCaCr, LaSrCrFe, YSZ, CGO, SDC, SSZ, LSGM, stainless steel, and combinations thereof. In an embodiment, one of the electrodes comprises lanthanum chromite and a material selected from the group consisting of doped ceria, yttria-stabilized zirconia (YSZ), lanthanum strontium gallate magnesite (LSGM), scandia-stabilized zirconia (SSZ), Sc and Ce doped zirconia, and combinations thereof. In an embodiment, the lanthanum chromite comprises undoped lanthanum chromite, strontium doped lanthanum chromite, iron doped lanthanum chromite, strontium and iron doped lanthanum chromite, lanthanum calcium chromite, or combinations thereof.

In an embodiment, the electrochemical reforming reactions comprise electrochemical half-cell reactions, wherein the half-cell reactions are:

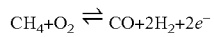 a)

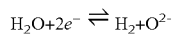 b)

In an embodiment, the half-cell reactions take place at triple phase boundaries, wherein the triple phase boundaries are the intersections of pores with the electronically conducting phase and the ionically conducting phase. In an embodiment, the ionically conducting membrane conducts protons or oxide ions. In an embodiment, the ionically conducting membrane is impermeable to fluid flow. In an embodiment, the membrane comprises an electronically conducting phase containing doped lanthanum chromite or an electronically conductive metal or combination thereof; and wherein the membrane comprises an ionically conducting phase containing a material selected from the group consisting of gadolinium doped ceria (CGO), samarium doped ceria (SDC), yttria-stabilized zirconia (YSZ), lanthanum strontium gallate magnesite (LSGM), scandia-stabilized zirconia (SSZ), Sc and Ce doped zirconia, and combinations thereof. In an embodiment, the doped lanthanum chromite comprises strontium doped lanthanum chromite, iron doped lanthanum chromite, strontium and iron doped lanthanum chromite, lanthanum calcium chromite, or combinations thereof; and wherein the conductive metal comprises Ni, Cu, Ag, Au, Pt, Rh, Co, Ru, or combinations thereof. In an embodiment, the membrane comprises gadolinium doped ceria (CGO) or samarium doped ceria (SDC) or both.

In an embodiment, the membrane consists of gadolinium doped ceria (CGO) or samarium doped ceria (SDC) or both. In an embodiment, the ionically conducting membrane also conducts electrons and wherein the reactor comprises no interconnect.

Further discussed herein is a reactor comprising: an anode and a mixed conducting membrane; wherein the anode and the mixed conducting membrane are in contact with each other, and wherein the anode promotes electrochemical hydrocarbon reforming reactions. In an embodiment, the anode is exposed to a reducing environment and the electrochemical reaction taking place in anode is oxidation. In an embodiment, no current collector is attached to the anode. In an embodiment, the reactor has no interconnect.

In an embodiment, the membrane comprises an electronically conducting phase containing doped lanthanum chromite or an electronically conductive metal or combination thereof; and wherein the membrane comprises an ionically conducting phase containing a material selected from the group consisting of gadolinium doped ceria (CGO), samarium doped ceria (SDC), yttria-stabilized zirconia (YSZ), lanthanum strontium gallate magnesite (LSGM), scandia-stabilized zirconia (SSZ), Sc and Ce doped zirconia, and combinations thereof. In an embodiment, the doped lanthanum chromite comprises strontium doped lanthanum chromite, iron doped lanthanum chromite, strontium and iron doped lanthanum chromite, lanthanum calcium chromite, or combinations thereof; and wherein the conductive metal comprises Ni, Cu, Ag, Au, Pt, Rh, Co, Ru, or combinations thereof. In an embodiment, the membrane comprises gadolinium doped ceria (CGO) or samarium doped ceria (SDC) or both. In an embodiment, the membrane consists of gadolinium doped ceria (CGO) or samarium doped ceria (SDC) or both.

In an embodiment, the anode comprises doped or undoped ceria and a material selected from the group consisting of Cu, CuO, Cu$_2$O, Ag, Ag$_2$O, Au, Au$_2$O, Au$_2$O$_3$, Pt, Pd, Ru, Rh, Ir, LaCaCr, LaSrCrFe, YSZ, CGO, SDC, SSZ, LSGM, stainless steel, and combinations thereof. In an embodiment, the anode comprises lanthanum chromite and a material selected from the group consisting of doped ceria, yttria-stabilized zirconia (YSZ), lanthanum strontium gallate magnesite (LSGM), scandia-stabilized zirconia (SSZ), Sc and Ce doped zirconia, and combinations thereof. In an embodiment, the lanthanum chromite comprises undoped lanthanum chromite, strontium doped lanthanum chromite, iron doped lanthanum chromite, strontium and iron doped lanthanum chromite, lanthanum calcium chromite, or combinations thereof.

Also discussed herein is a method of producing hydrogen comprising providing an electrochemical (EC) reactor having a mixed-conducting membrane, introducing a first stream comprising a hydrocarbon to the reactor, introducing a second stream comprising water to the reactor, and reducing the water in the second stream to produce hydrogen, wherein the first stream and the second stream do not come in contact with each other in the reactor, and wherein the hydrocarbon is reformed electrochemically in the EC reactor. In an embodiment, the method comprises recycling at least portion of the produced hydrogen to the first stream or the second stream or both.

In an embodiment, the reduction from water to hydrogen takes place electrochemically. In an embodiment, water in the second stream is steam. In an embodiment, the first stream and the second stream are separated by the membrane. In an embodiment, the second stream comprises hydrogen. In an embodiment, the first stream consists essentially of a hydrocarbon and hydrogen.

In an embodiment, the EC reactor comprises an anode on the first stream side and a cathode on the second stream side, wherein the anode and the cathode are separated by the membrane and are in contact with the membrane respectively. In an embodiment, the anode and the cathode are separated by the membrane and are both exposed to a reducing environment.

In an embodiment, the anode comprises doped or undoped ceria and a material selected from the group consisting of Cu, CuO, Cu$_2$O, Ag, Ag$_2$O, Au, Au$_2$O, Au$_2$O$_3$, Pt, Pd, Ru, Rh, Ir, LaCaCr, LaSrCrFe, YSZ, CGO, SDC, SSZ, LSGM, stainless steel, and combinations thereof; and wherein the cathode comprises Ni or NiO and a material selected from the group consisting of YSZ, 8YSZ, CoCGO, CGO, SDC, SSZ, LSGM, and combinations thereof. In an embodiment, the anode comprises lanthanum chromite and a material selected from the group consisting of doped ceria, yttria-stabilized zirconia (YSZ), lanthanum strontium gallate magnesite (LSGM), scandia-stabilized zirconia (SSZ), Sc and Ce doped zirconia, and combinations thereof; wherein the cathode comprises Ni or NiO and a material selected from the group consisting of YSZ, 8YSZ, CoCGO, CGO, SDC, SSZ, LSGM, and combinations thereof. In an embodiment, the lanthanum chromite comprises undoped lanthanum chromite, strontium doped lanthanum chromite, iron doped lanthanum chromite, strontium and iron doped lanthanum chromite, lanthanum calcium chromite, or combinations thereof.

In an embodiment, the reactor comprises no interconnect. In an embodiment, the reactor does not generate electricity and does not need electricity to operate. In an embodiment, the first stream has a temperature of no less than 700° C. or no less than 800° C. or no less than 900° C.

Electrochemical Reactor

Contrary to conventional practice, an electrochemical reactor has been discovered, which comprises an ionically conducting membrane, wherein the reactor is capable of performing the water gas shift reactions electrochemically, wherein electrochemical water gas shift reactions involve the exchange of an ion through the membrane and include forward water gas shift reactions, or reverse water gas shift reactions, or both. This is different from water gas shift reactions via chemical pathways because chemical water gas shift reactions involve direct combination of reactants.

In an embodiment, the reactor comprises porous electrodes that comprise metallic phase and ceramic phase, wherein the metallic phase is electronically conductive and wherein the ceramic phase is ionically conductive. In various embodiments, the electrodes have no current collector attached to them. In various embodiments, the reactor does not contain any current collector. Clearly, such a reactor is fundamentally different from any electrolysis device or fuel cell.

In an embodiment, one of the electrodes in the reactor is an anode that is configured to be exposed to a reducing environment while performing oxidation reactions electrochemically. In various embodiments, the electrodes comprise Ni or NiO and a material selected from the group consisting of YSZ, 8YSZ, CoCGO, CGO, SDC, SSZ, LSGM, and combinations thereof.

The electrochemical water gas shift reactions taking place in the reactor comprise electrochemical half-cell reactions, wherein the half-cell reactions are:

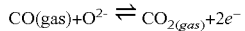

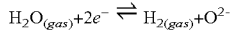

In various embodiments, the half-cell reactions take place at triple phase boundaries, wherein the triple phase boundaries are the intersections of pores with the electronically conducting phase and the ionically conducting phase. Furthermore, the reactor is also capable of performing chemical water gas shift reactions.

In various embodiments, the ionically conducting membrane conducts protons or oxide ions. In various embodiments, the ionically conducting membrane comprises solid oxide. In various embodiments, the ionically conducting membrane is impermeable to fluid flow. In various embodiments, the ionically conducting membrane also conducts electrons and wherein the reactor comprises no interconnect.

In an embodiment, the membrane comprises an electronically conducting phase containing doped lanthanum chromite or an electronically conductive metal or combination thereof; and wherein the membrane comprises an ionically conducting phase containing a material selected from the group consisting of gadolinium doped ceria (CGO), samarium doped ceria (SDC), yttria-stabilized zirconia (YSZ), lanthanum strontium gallate magnesite (LSGM), scandia-stabilized zirconia (SSZ), Sc and Ce doped zirconia, and combinations thereof. In an embodiment, the doped lanthanum chromite comprises strontium doped lanthanum chromite, iron doped lanthanum chromite, strontium and iron doped lanthanum chromite, lanthanum calcium chromite, or combinations thereof; and wherein the conductive metal comprises Ni, Cu, Ag, Au, Pt, Rh, Co, Ru, or combinations thereof.

Also discussed herein is a reactor comprising a bi-functional layer and a mixed conducting membrane; wherein the bi-functional layer and the mixed conducting membrane are in contact with each other, and wherein the bi-functional layer catalyzes reverse-water-gas-shift (RWGS) reaction and functions as an anode in an electrochemical reaction. In an embodiment, the bi-functional layer as the anode is exposed to a reducing environment and the electrochemical reaction taking place in the bi-functional layer is oxidation. In an embodiment, no current collector is attached to the bi-functional layer. In an embodiment, the bi-functional layer comprises Ni or NiO and a material selected from the group consisting of YSZ, 8YSZ, CoCGO, CGO, SDC, SSZ, LSGM, and combinations thereof.

In an embodiment, the membrane comprises an electronically conducting phase containing doped lanthanum chromite or an electronically conductive metal or combination thereof; and wherein the membrane comprises an ionically conducting phase containing a material selected from the group consisting of gadolinium doped ceria (CGO), samarium doped ceria (SDC), yttria-stabilized zirconia (YSZ), lanthanum strontium gallate magnesite (LSGM), scandia-stabilized zirconia (SSZ), Sc and Ce doped zirconia, and combinations thereof. In an embodiment, the doped lanthanum chromite comprises strontium doped lanthanum chromite, iron doped lanthanum chromite, strontium and iron doped lanthanum chromite, lanthanum calcium chromite, or combinations thereof; and wherein the conductive metal comprises Ni, Cu, Ag, Au, Pt, Rh, Co, Ru, or combinations thereof.

Such a reactor has various applications. In an embodiment, the reactor is utilized to produce carbon monoxide via hydrogenation of carbon dioxide. In another embodiment, the reactor is used to adjust syngas composition (i.e., H$_2$/CO ratio) by converting $H_2$ to CO or converting CO to $H_2$. The following discussion takes hydrogen production as an example, but the application of the reactor is not limited to only hydrogen production.

FIG. 1 illustrates an electrochemical reactor or an electrochemical (EC) gas producer 100, according to an embodiment of this disclosure. EC gas producer device 100 comprises first electrode 101, membrane 103 a second electrode 102. First electrode 101 (also referred to as anode or bi-functional layer) is configured to receive a fuel 104. Stream 104 contains no oxygen. Second electrode 102 is configured to receive water (e.g., steam) as denoted by 105.

In an embodiment, device 100 is configured to receive CO, i.e., carbon monoxide (104) and to generate $CO/CO_2$ (106) at the first electrode (101); device 100 is also configured to receive water or steam (105) and to generate hydrogen (107) at the second electrode (102). In some cases, the second electrode receives a mixture of steam and hydrogen. Since water provides the oxide ion (which is transported through the membrane) needed to oxidize the CO at the opposite electrode, water is considered the oxidant in this scenario. As such, the first electrode 101 is performing oxidation reactions in a reducing environment. In various embodiments, 103 represents an oxide ion conducting membrane. In an embodiment, the first electrode 101 and the second electrode 102 comprise Ni-YSZ or NiO-YSZ. In an embodiment, the oxide ion conducting membrane 103 also conducts electrons. In these cases, gases containing $H_2$, CO, syngas, or combinations thereof are suitable as feed stream 104. In various embodiments, electrodes 101 and 102 comprise Ni or NiO and a material selected from the group consisting of YSZ, 8YSZ, CoCGO, CGO, SDC, SSZ, LSGM, and combinations thereof. Alternatively, gases containing a hydrocarbon are reformed before coming into contact with the membrane 103/electrode 101. The reformer is configured to perform steam reforming, dry reforming, or combination thereof. The reformed gases are suitable as feed stream 104.

In an embodiment, device 100 is configured to simultaneously produce hydrogen 107 from the second electrode 102 and syngas 106 from the first electrode 101. In an embodiment, 104 represents methane and water or methane and carbon dioxide entering device 100. In another embodiment, 104 represents methane. In other embodiments, 103 represents an oxide ion conducting membrane. Arrow 104 represents an influx of hydrocarbon and water or hydrocarbon and carbon dioxide. Arrow 105 represents an influx of water or water and hydrogen. In some embodiments, electrode 101 comprises Cu-CGO, or further optionally comprises CuO or $Cu_2O$ or combination thereof; electrode 102 comprises Ni-YSZ or NiO-YSZ. In some cases, electrode 101 comprises doped or undoped ceria and a material selected from the group consisting of Cu, CuO, $Cu_2O$, Ag, $Ag_2O$, Au, $Au_{20}$, $Au_{203}$, Pt, Pd, Ru, Rh, Ir, LaCaCr, LaSrCrFe, YSZ, CGO, SDC, SSZ, LSGM, stainless steel, and combinations thereof; and electrode 102 comprises Ni or NiO and a material selected from the group consisting of YSZ, 8YSZ, CoCGO, CGO, SDC, SSZ, LSGM, and combinations thereof. In some cases, electrode 101 comprises lanthanum chromite and a material selected from the group consisting of doped ceria, yttria-stabilized zirconia (YSZ), lanthanum strontium gallate magnesite (LSGM), scandia-stabilized zirconia (SSZ), Sc and Ce doped zirconia, and combinations thereof; electrode 102 comprises Ni or NiO and a material selected from the group consisting of YSZ, 8YSZ, CoCGO, CGO, SDC, SSZ, LSGM, and combinations thereof. In various embodiments, the lanthanum chromite comprises undoped lanthanum chromite, strontium doped lanthanum chromite, iron doped lanthanum chromite, strontium and iron doped lanthanum chromite, lanthanum calcium chromite, or combinations thereof.

Arrow 104 represents an influx of hydrocarbon with little to no water, with no carbon dioxide, and with no oxygen, and 105 represents an influx of water or water and hydrogen. Since water provides the oxide ion (which is transported through the membrane) needed to oxidize the hydrocarbon/fuel at the opposite electrode, water is considered the oxidant in this scenario. In these cases, gases containing a hydrocarbon are suitable as feed stream 104 and reforming of the gases is not necessary. In these cases, electrochemical reforming is enabled by the reactor, where the oxygen needed to reform the methane derives from the reduction of water, and it is supplied across the membrane. The half-cell reactions are electrochemical and are as follows:

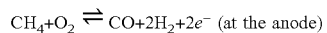
$CH_4 + O_2 \rightleftharpoons CO + 2H_2 + 2e^-$ (at the anode)

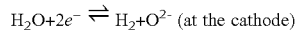
$H_2O + 2e^- \rightleftharpoons H_2 + O^{2-}$ (at the cathode)

In this disclosure, no oxygen means there is no oxygen present at first electrode 101 or at least not enough oxygen that would interfere with the reaction. Also, in this disclosure, water only means that the intended feedstock is water and does not exclude trace elements or inherent components in water. For example, water containing salts or ions is considered to be within the scope of water only. Water only also does not require 100% pure water but includes this embodiment. In embodiments, the hydrogen produced from second electrode 102 is pure hydrogen, which means that in the produced gas phase from the second electrode, hydrogen is the main component. In some cases, the hydrogen content is no less than 99.5%. In some cases, the hydrogen content is no less than 99.9%. In some cases, the hydrogen produced from the second electrode is the same purity as that produced from electrolysis of water.

In an embodiment, first electrode 101 is configured to receive methane or methane and water or methane and carbon dioxide. In an embodiment, the fuel comprises a hydrocarbon having a carbon number in the range of 1-12, 1-10 or 1-8. Most preferably, the fuel is methane or natural gas, which is predominantly methane. In an embodiment, the device does not generate electricity and is not a fuel cell.

In various embodiments, the device does not contain a current collector. In an embodiment, the device comprises no interconnect. There is no need for electricity and such a device is not an electrolyzer. This is a major advantage of the EC reactor of this disclosure. The membrane 103 is configured to conduct electrons and as such is mixed conducting, i.e., both electronically conductive and ionically conductive. In an embodiment, the membrane 103 conducts oxide ions and electrons. In an embodiment, the electrodes 101, 102 and the membrane 103 are tubular (see, e.g., FIGS. 2A and 2B). In an embodiment, the electrodes 101, 102 and the membrane 103 are planar. In these embodiments, the electrochemical reactions at the anode and the cathode are spontaneous without the need to apply potential/electricity to the reactor.

In an embodiment, the electrochemical reactor (or EC gas producer) is a device comprising a first electrode, a second electrode, and a membrane between the electrodes, wherein the first electrode and the second electrode comprise a metallic phase that does not contain a platinum group metal when the device is in use, and wherein the membrane is oxide ion conducting. In an embodiment, the first electrode is configured to receive a fuel. In an embodiment, said fuel comprises a hydrocarbon or hydrogen or carbon monoxide or combinations thereof. In an embodiment, the second electrode is configured to receive water and hydrogen and configured to reduce the water to hydrogen. In various embodiments, such reduction takes place electrochemically.

In an embodiment, the membrane comprises an electronically conducting phase containing doped lanthanum chromite or an electronically conductive metal or combination thereof; and wherein the membrane comprises an ionically conducting phase containing a material selected from the group consisting of gadolinium doped ceria (CGO), samarium doped ceria (SDC), yttria-stabilized zirconia (YSZ), lanthanum strontium gallate magnesite (LSGM), scandia-stabilized zirconia (SSZ), Sc and Ce doped zirconia, and combinations thereof. In an embodiment, the doped lanthanum chromite comprises strontium doped lanthanum chromite, iron doped lanthanum chromite, strontium and iron doped lanthanum chromite, lanthanum calcium chromite, or combinations thereof; and wherein the conductive metal comprises Ni, Cu, Ag, Au, Pt, Rh, Co, Ru, or combinations thereof.

Figure 2A:
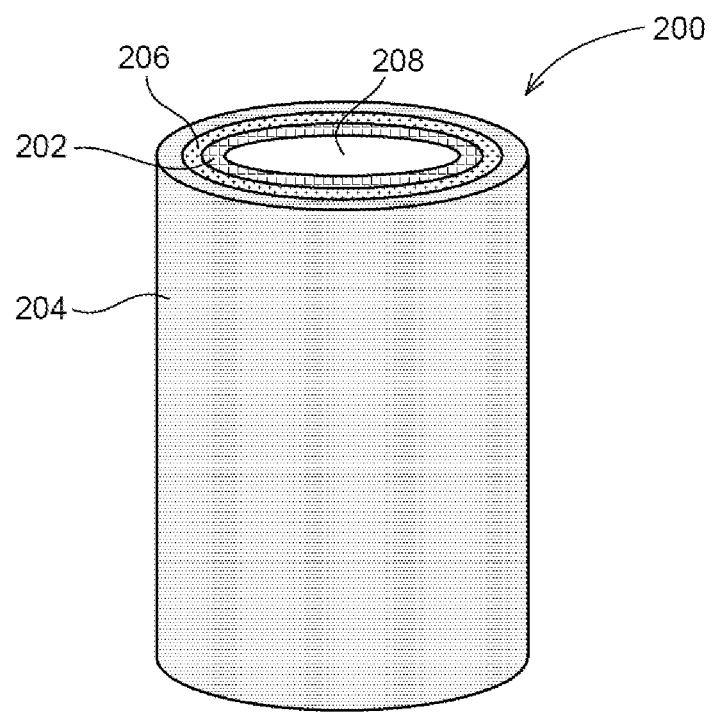
FIG. 2A illustrates a tubular electrochemical reactor, according to an embodiment of this disclosure.
Figure 2B:
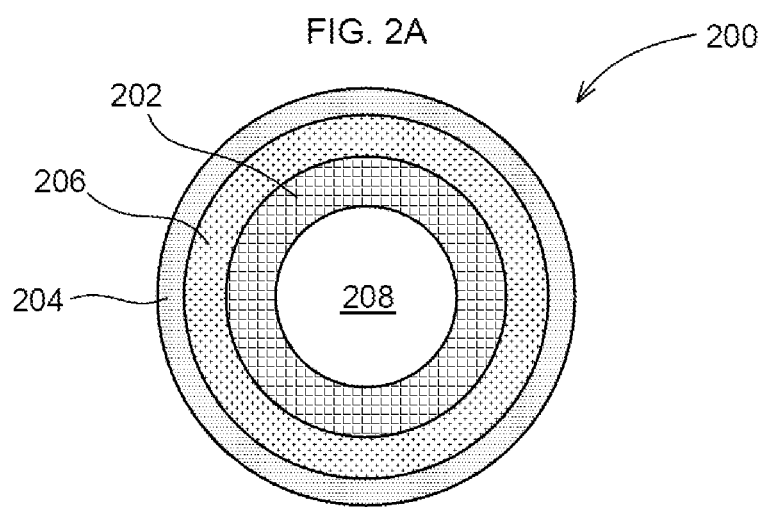
FIG. 2B illustrates a cross section of a tubular electrochemical reactor, according to an embodiment of this disclosure.

FIG. 2A illustrates (not to scale) a tubular electrochemical (EC) reactor or an EC gas producer 200, according to an embodiment of this disclosure. Tubular producer 200 includes an inner tubular structure 202, an outer tubular structure 204, and a membrane 206 disposed between the inner and outer tubular structures 202, 204, respectively. Tubular producer 200 further includes a void space 208 for fluid passage. FIG. 2B illustrates (not to scale) a cross section of a tubular producer 200, according to an embodiment of this disclosure. Tubular producer 200 includes a first inner tubular structure 202, a second outer tubular structure 204, and a membrane 206 between the inner and outer tubular structures 202, 204. Tubular producer 200 further includes a void space 208 for fluid passage.

In an embodiment, the electrodes and the membrane are tubular with the first electrode being outermost and the second electrode being innermost, wherein the second electrode is configured to receive water and hydrogen. In an embodiment, the electrodes and the membrane are tubular with the first electrode being innermost and the second electrode being outermost, wherein the second electrode is configured to receive water and hydrogen. In an embodiment, the electrodes and the membrane are tubular.

In an embodiment, the reactor comprises a catalyst that promotes chemical reverse water gas shift (RWGS) reactions. In an embodiment, the catalyst is a high temperature RWGS catalyst. In an embodiment, the catalyst is part of an anode in the reactor. In an embodiment, the catalyst is configured to be outside of the anode. For example, Ni—$Al_2O_3$ pellets as such a catalyst are placed in the reactor surrounding the tubes as shown in FIG. 2A and FIG. 2B. In an embodiment, the catalyst comprises Ni, Cu, Fe, Pt-group metals, or combinations thereof. In an embodiment, the catalyst comprises Pt, Cu, Rh, Ru, Fe, Ni, or combinations thereof.

Herein discussed is a method of producing hydrogen comprising providing an electrochemical (EC) reactor having a mixed-conducting membrane, introducing a first stream comprising a fuel to the reactor, introducing a second stream comprising water to the reactor, reducing the water in the second stream to produce hydrogen, and recycling at least portion of the produced hydrogen to the first stream, wherein the first stream and the second stream do not come in contact with each other in the reactor.

In an embodiment, the reduction from water to hydrogen takes place electrochemically. In an embodiment, water in the second stream is steam. In an embodiment, the first stream and the second stream are separated by the membrane. In an embodiment, the second stream comprises hydrogen and wherein optionally the first stream comprises water, carbon dioxide, an inert gas, or combinations thereof. In an embodiment, the fuel comprises a hydrocarbon, carbon monoxide, hydrogen, or combinations thereof. In an embodiment, the first stream consists essentially of a hydrocarbon and recycled hydrogen.

In an embodiment, the EC reactor comprises an anode on the first stream side and a cathode on the second stream side, wherein the anode and the cathode are separated by the membrane and are in contact with the membrane respectively. In an embodiment, the anode and the cathode are separated by the membrane and are both exposed to a reducing environment. In an embodiment, the anode and the cathode comprise Ni or NiO and a material selected from the group consisting of YSZ, 8YSZ, CoCGO, CGO, SDC, SSZ, LSGM, and combinations thereof. In an embodiment, the anode comprises doped or undoped ceria and a material selected from the group consisting of Cu, CuO, $Cu_2O$, Ag, $Ag_2O$, Au, $Au_2O$, $Au_2O_3$, Pt, Pd, Ru, Rh, Ir, LaCaCr, LaSrCrFe, YSZ, CGO, SDC, SSZ, LSGM, stainless steel, and combinations thereof; and wherein the cathode comprises Ni or NiO and a material selected from the group consisting of YSZ, 8YSZ, CoCGO, CGO, SDC, SSZ, LSGM, and combinations thereof.

In an embodiment, the anode comprises lanthanum chromite and a material selected from the group consisting of doped ceria, yttria-stabilized zirconia (YSZ), lanthanum strontium gallate magnesite (LSGM), scandia-stabilized zirconia (SSZ), Sc and Ce doped zirconia, and combinations thereof; wherein the cathode comprises Ni or NiO and a material selected from the group consisting of YSZ, 8YSZ, CoCGO, CGO, SDC, SSZ, LSGM, and combinations thereof; and wherein optionally the lanthanum chromite comprises undoped lanthanum chromite, strontium doped lanthanum chromite, iron doped lanthanum chromite, strontium and iron doped lanthanum chromite, lanthanum calcium chromite, or combinations thereof.

In an embodiment, at least a portion of the anode exhaust gas is used to produce steam from water. In an embodiment, at least a portion of the anode exhaust gas is sent to a carbon capture unit. In an embodiment, the method comprises recycling at least portion of the produced hydrogen to the second stream.

In an embodiment, the membrane comprises an electronically conducting phase containing doped lanthanum chromite or an electronically conductive metal or combination thereof; and wherein the membrane comprises an ionically conducting phase containing a material selected from the group consisting of gadolinium doped ceria (CGO), samarium doped ceria (SDC), yttria-stabilized zirconia (YSZ), lanthanum strontium gallate magnesite (LSGM), scandia-stabilized zirconia (SSZ), Sc and Ce doped zirconia, and combinations thereof. In an embodiment, the doped lanthanum chromite comprises strontium doped lanthanum chromite, iron doped lanthanum chromite, strontium and iron doped lanthanum chromite, lanthanum calcium chromite, or combinations thereof; and wherein the conductive metal comprises Ni, Cu, Ag, Au, Pt, Rh, Co, Ru, or combinations thereof. In an embodiment, the membrane comprises gadolinium doped ceria (CGO), samarium doped ceria (SDC). In an embodiment, the membrane consists of gadolinium doped ceria (CGO), samarium doped ceria (SDC).

In an embodiment, the membrane comprises gadolinium or samarium doped ceria. In an embodiment, the membrane consists of gadolinium or samarium doped ceria. In an embodiment, the membrane comprises cobalt-CGO (CoCGO). In an embodiment, the membrane consists essentially of CoCGO. In an embodiment, the membrane consists of CoCGO. In an embodiment, the membrane comprises LST (lanthanum-doped strontium titanate)-YSZ or LST-SSZ or LST-SCZ (scandia-ceria-stabilized zirconia). In an embodiment, the membrane consists essentially of LST-YSZ or LST-SSZ or LST-SCZ. In an embodiment, the membrane consists of LST-YSZ or LST-SSZ or LST-SCZ. In this disclosure, LST-YSZ refers to a composite of LST and YSZ. In various embodiments, the LST phase and the YSZ phase percolate each other. In this disclosure, LST-SSZ refers to a composite of LST and SSZ. In various embodiments, the LST phase and the SSZ phase percolate each other. In this disclosure, LST-SCZ refers to a composite of LST and SCZ. In various embodiments, the LST phase and the SCZ phase percolate each other. YSZ, SSZ, and SCZ are types of stabilized zirconia's.

In an embodiment, the membrane is impermeable to fluid flow. In an embodiment, the membrane conducts protons or oxide ions. In an embodiment, the membrane also conducts electrons and wherein the reactor comprises no interconnect. In an embodiment, the reactor does not generate electricity and does not need electricity to operate. In an embodiment, the first stream has a temperature of no less than 700° C. or no less than 800° C. or no less than 900° C.

Hydrogen Production System and Method

Figure 3:
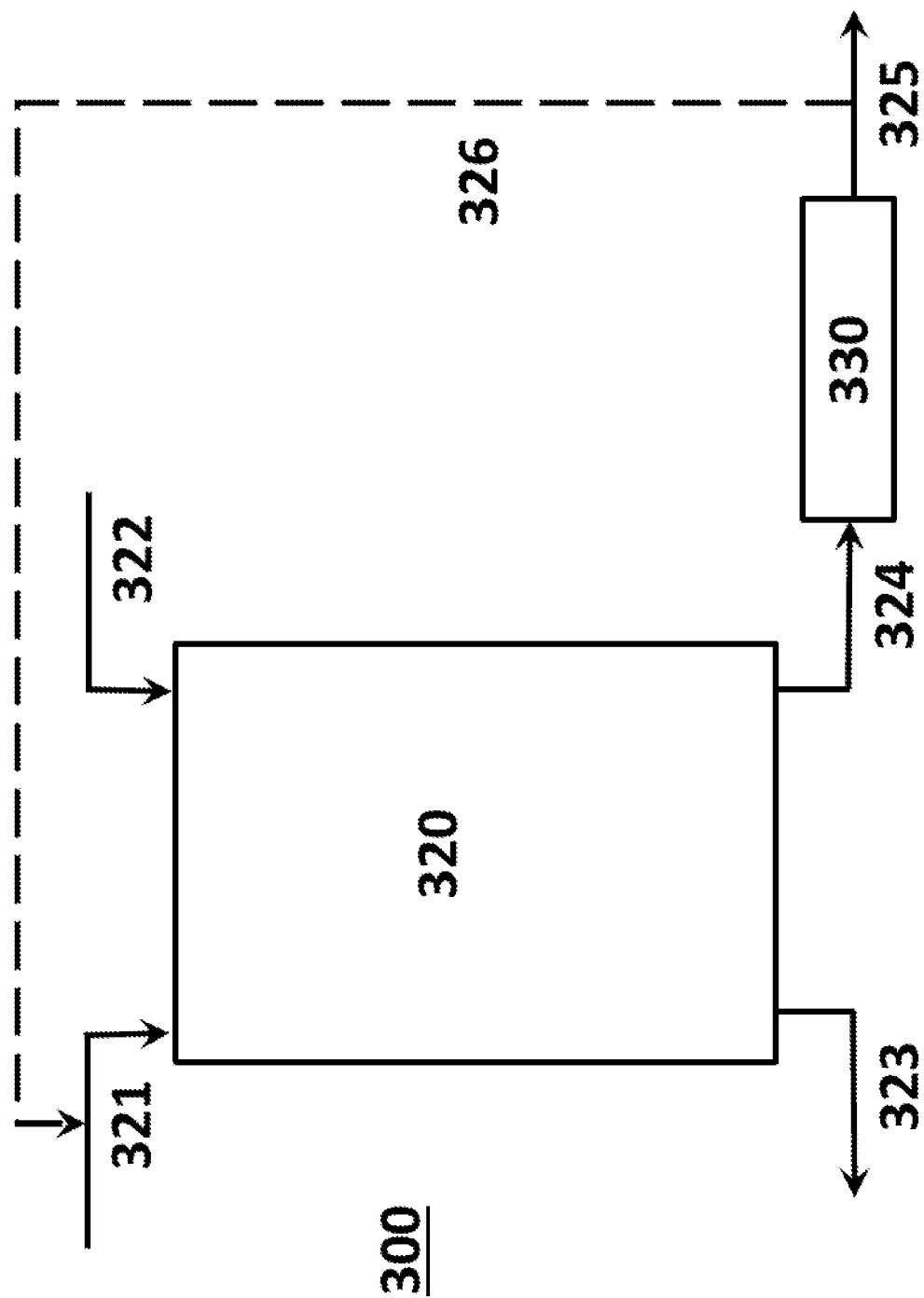
FIG. 3 illustrates an integrated hydrogen production system as discussed herein, according to an embodiment of this disclosure.

As illustrated in FIG. 3, an integrated hydrogen production system 300 is shown. System 300 comprises an electrochemical (EC) reactor or gas producer 320 and a dehydrator 330. A feed stream 321 is sent to an anode of the EC reactor, wherein feed stream comprises a fuel. The fuel may be a hydrocarbon, CO, Hz, or combinations thereof 322 represents steam or steam and hydrogen sent to a cathode of the EC reactor. The anode and the cathode are separated by a gas-tight membrane (not shown in FIG. 3) in EC reactor 320. As such, the gases on the anode side do not come into contact with the gases on the cathode side. The membrane is mixed-conducting. For example, the membrane conducts both oxide ions and electrons. The gas producer/EC reactor 320 generates a first product stream 323 (at the anode) comprising water and $CO_2$ and unreacted feed components. The gas producer/EC reactor 320 generates a second product stream 324 (at the cathode) comprising $H_2$ and $H_2O$. The two product streams do not come in contact with each other. They are also separated by the membrane.

In some cases, the second product stream 324 is sent to the dehydrator to separate water from the hydrogen. Hydrogen is collected as stream 325, a portion of which (stream 326) is recycled to feed stream 321 for the anode. The recycled hydrogen stream is particularly advantageous when feed stream 321 comprises primarily hydrocarbon(s). In these scenarios, the hydrocarbons are directly oxidized on the anode side in a reducing environment and hydrogen is produced from water on the cathode side. No substantial amounts of water of $CO_2$ are present in feed stream 321. Since feed stream 321 is heated to high temperatures (>600° C. or 700° C. or 800° C.) to suit the reactions taking place in EC reactor 320, the recycled/added hydrogen reduces any coking that would otherwise take place from hydrocarbon pyrolysis. In these cases, the anode of the EC reactor comprises doped or undoped ceria and a material selected from the group consisting of Cu, CuO, $Cu_2O$, Ag, $Ag_2O$, Au, $Au_2O$, $Au_2O_3$, Pt, Pd, Ru, Rh, Ir, LaCaCr, LaSrCrFe, YSZ, CGO, SDC, SSZ, LSGM, stainless steel, and combinations thereof; and the cathode comprises Ni or NiO and a material selected from the group consisting of YSZ, 8YSZ, CoCGO, CGO, SDC, SSZ, LSGM, and combinations thereof. In some cases, the anode of the reactor comprises lanthanum chromite and a material selected from the group consisting of doped ceria, yttria-stabilized zirconia (YSZ), lanthanum strontium gallate magnesite (LSGM), scandia-stabilized zirconia (SSZ), Sc and Ce doped zirconia, and combinations thereof; the cathode comprises Ni or NiO and a material selected from the group consisting of YSZ, 8YSZ, CoCGO, CGO, SDC, SSZ, LSGM, and combinations thereof. In various cases, the lanthanum chromite comprises undoped lanthanum chromite, strontium doped lanthanum chromite, iron doped lanthanum chromite, strontium and iron doped lanthanum chromite, lanthanum calcium chromite, or combinations thereof.

In an embodiment, the steam that enters the EC reactor has a temperature of no less than 600° C., or no less than 700° C., or no less than 800° C., or no less than 850° C., or no less than 900° C., or no less than 950° C., or no less than 1000° C., or no less than 1100° C. In an embodiment, the steam that enters the electrochemical reactor has a pressure of no greater than 10 psi, or no greater than 5 psi, or no greater than 3 psi.

As such, hydrogen is produced via a method comprising: introducing steam and a fuel into an electrochemical (EC) reactor, wherein the fuel and the steam do not come in contact with each other in the EC reactor. The EC reactor comprises an ionically conducting membrane, wherein the reactor is capable of performing the water gas shift reactions electrochemically, wherein electrochemical water gas shift reactions involve the exchange of an ion through the membrane and include forward water gas shift reactions, or reverse water gas shift reactions, or both. Furthermore, the membrane separates the fuel from the steam. In various embodiment, the pressure differential between the fuel side and the steam side is no greater than 2 psi, or no greater than 1.5 psi, or no greater than 1 psi.

In various embodiments, the EC reactor oxidizes the fuel in a reducing environment and generates a first product stream comprising CO and $CO_2$; and wherein the EC reactor reduces steam to hydrogen electrochemically and generates a second product stream comprising $H_2$ and $H_2O$. In various embodiments, the membrane separates the first and second product streams. In various embodiments, at least a portion of the first product stream is utilized to produce steam from water. In various embodiments, at least a portion of the first product stream is sent to a carbon capture unit to sequester $CO_2$. In various embodiments, at least a portion of the second product stream is recycled to enter the EC reactor. In an embodiment, water is condensed and separated from the second product stream and hydrogen is extracted. The extracted hydrogen is used in the various applications as previously discussed herein. In addition, the extracted hydrogen is used to reduce metal ores. For example, the hydrogen is used in a blast furnace or a direct reduction process. In some cases, the extracted hydrogen is recycled to the EC reactor on the cathode side.

Disclosed herein is a method comprising providing a device comprising a first electrode, a second electrode, and a membrane between the electrodes, introducing a first stream to the first electrode, introducing a second stream to the second electrode, extracting hydrogen from the second electrode, wherein the first electrode and the second electrode comprise a metallic phase that does not contain a platinum group metal when the device is in use. In an embodiment, the membrane is oxide ion conducting.

In an embodiment, the device is operated at a temperature no less than 500° C., or no less than 600° C., or no less than 700° C., or no less than 750° C., or no less than 800° C., or no less than 850° C., or no less than 900° C., or no less than 950° C., or no less than 1000° C. In various embodiment, the pressure differential between the first electrode and the second electrode is no greater than 2 psi, or no greater than 1.5 psi, or no greater than 1 psi. In an embodiment, the first stream enters the device at a pressure of no greater than 10 psi, or no greater than 5 psi, or no greater than 3 psi. In an embodiment, the second stream enters the device at a pressure of no greater than 10 psi, or no greater than 5 psi, or no greater than 3 psi.

In an embodiment, the first stream comprises a fuel. In an embodiment, said fuel comprises a hydrocarbon or hydrogen or carbon monoxide or combinations thereof. In an embodiment, the first stream is directly introduced into the first electrode, or the second stream is directly introduced into the second electrode or both. In an embodiment, the method comprises providing a reformer or a catalytic partial oxidation (CPOX) reactor upstream of the first electrode, wherein the first stream passes through the reformer or the CPOX reactor before being introduced to the first electrode, wherein the first electrode comprises Ni or NiO. In an embodiment, the reformer is a steam reformer or an autothermal reformer.

In an embodiment, the second stream consists of water and hydrogen. In an embodiment, said first stream comprises carbon monoxide and no significant amount of hydrogen or hydrocarbon or water. In such cases, an upstream reformer is not needed. In this disclosure, no significant amount of hydrogen or hydrocarbon or water means that the volume content of the hydrogen or hydrocarbon or water is no greater than 5%, or no greater than 3%, or no greater than 2%, or no greater than 1%, or no greater than 0.5%, or no greater than 0.1%, or no greater than 0.05%. In an embodiment, the first stream comprises syngas (CO and $H_2$). In an embodiment, the first stream comprises inert gases like argon or nitrogen. In an embodiment, the second stream consists of water and hydrogen.

In an embodiment, the method comprises using the extracted hydrogen in one of Fischer-Tropsch (FT) reactions, dry reforming reactions, Sabatier reaction catalyzed by nickel, Bosch reaction, reverse water gas shift reaction, electrochemical reaction to produce electricity, production of ammonia, production of fertilizer, electrochemical compressor for hydrogen storage, fueling hydrogen vehicles or hydrogenation reactions or combinations thereof.

Herein disclosed is a method of producing hydrogen comprising providing an electrochemical reactor, introducing a first stream comprising a fuel to the device, introducing a second stream comprising water to the device, reducing the water in the second stream to hydrogen, and extracting hydrogen from the device, wherein the first stream and the second stream do not come in contact with each other in the device. In various embodiments, the reduction from water to hydrogen takes place electrochemically. In an embodiment, the first stream does not come in contact with the hydrogen. In an embodiment, the first stream and the second stream are separated by a membrane in the device.

In an embodiment, the fuel comprises a hydrocarbon or hydrogen or carbon monoxide or combinations thereof. In an embodiment, the second stream comprises hydrogen. In an embodiment, the first stream comprises the fuel. In an embodiment, the fuel consists of carbon monoxide. In an embodiment, the first stream consists of carbon monoxide and carbon dioxide. In an embodiment, the second stream consists of water and hydrogen. In an embodiment, the second stream consists of steam and hydrogen.

It is to be understood that this disclosure describes exemplary embodiments for implementing different features, structures, or functions of the invention. Exemplary embodiments of components, arrangements, and configurations are described to simplify the present disclosure; however, these exemplary embodiments are provided merely as examples and are not intended to limit the scope of the invention. The embodiments as presented herein may be combined unless otherwise specified. Such combinations do not depart from the scope of the disclosure.

Additionally, certain terms are used throughout the description and claims to refer to particular components or steps. As one skilled in the art appreciates, various entities may refer to the same component or process step by different names, and as such, the naming convention for the elements described herein is not intended to limit the scope of the invention. Further, the terms and naming convention used herein are not intended to distinguish between components, features, and/or steps that differ in name but not in function.

While the disclosure is susceptible to various modifications and alternative forms, specific embodiments thereof are shown by way of example in the drawings and description. It should be understood, however, that the drawings and detailed description are not intended to limit the disclosure to the particular form disclosed, but on the contrary, the intention is to cover all modifications, equivalents and alternatives falling within the spirit and scope of this disclosure.

What is claimed is:

1. An electrochemical reactor comprising a porous anode and a porous cathode separated by a mixed-conducting membrane, wherein the membrane comprises CoCGO or LST (lanthanum-doped strontium titanate)-stabilized zirconia, wherein the cathode comprises Ni or NiO and a material selected from the group consisting of YSZ, 8YSZ, CGO, CoCGO, SDC, SSZ, LSGM, and combinations thereof, wherein the reactor is capable of reforming a hydrocarbon electrochemically, wherein the electrochemical reforming reactions involve the exchange of an ion through the membrane to oxidize the hydrocarbon.

2. The reactor of claim 1, wherein the porous anode and the porous cathode comprise metallic phase and ceramic phase, wherein the metallic phase is electronically conductive, and wherein the ceramic phase is ionically conductive.

3. The reactor of claim 1, wherein the anode and the cathode have no current collector attached.

4. The reactor of claim 1, wherein the anode and the cathode are both exposed to a reducing environment.

5. The reactor of claim 1, wherein the anode comprises doped or undoped ceria and a material selected from the group consisting of Cu, CuO, $Cu_2O$, Ag, $Ag_2O$, Au, $Au_2O$, $Au_2O_3$, Pt, Pd, Ru, Rh, Ir, LaCaCr, LaSrCrFe, YSZ, CGO, SDC, SSZ, LSGM, stainless steel, and combinations thereof.

6. The reactor of claim 1, wherein the anode comprises lanthanum chromite and a material selected from the group consisting of doped ceria, yttria-stabilized zirconia (YSZ), lanthanum strontium gallate magnesite (LSGM), scandia-stabilized zirconia (SSZ), Sc and Ce doped zirconia, and combinations thereof.

7. The reactor of claim 6, wherein the lanthanum chromite comprises undoped lanthanum chromite, strontium doped lanthanum chromite, iron doped lanthanum chromite, strontium and iron doped lanthanum chromite, lanthanum calcium chromite, or combinations thereof.

8. The reactor of claim 1, wherein the electrochemical reforming reactions comprise electrochemical half-cell reactions, wherein the half-cell reactions are:

a.  $CH_4 + O_2 \rightleftharpoons CO + 2H_2 + 2e^-$ b.  $H_2O + 2e^- \rightleftharpoons H_2 + O^{2-}$ 9. The reactor of claim 8, wherein the half-cell reactions take place at triple phase boundaries, wherein the triple phase boundaries are the intersections of pores with the electronically conducting phase and the ionically conducting phase.

10. The reactor of claim 1, wherein the stabilized zirconia comprises YSZ or SSZ or SCZ (scandia-ceria-stabilized zirconia).

11. A reactor comprising: an anode and a cathode separated by a mixed conducting membrane; wherein the membrane comprises CoCGO or LST (lanthanum-doped strontium titanate)-stabilized zirconia, wherein the cathode comprises Ni or NiO and a material selected from the group consisting of YSZ, 8YSZ, CGO, CoCGO, SDC, SSZ, LSGM, and combinations thereof, and wherein the anode promotes electrochemical hydrocarbon reforming reactions.

12. The reactor of claim 11, wherein the anode is exposed to a reducing environment and the cathode is simultaneously exposed to a reducing environment.

13. The reactor of claim 11 comprising no interconnect.

14. A method of producing hydrogen comprising
   a. providing the reactor of claim 1 or 11,
   b. introducing a first stream comprising a hydrocarbon to the reactor,
   c. introducing a second stream comprising water to the reactor, and
   d. reducing the water in the second stream to produce hydrogen,
   wherein the first stream and the second stream do not come in contact with each other in the reactor, and wherein the hydrocarbon is reformed electrochemically in the EC reactor.

15. The method of claim 14, wherein the reduction from water to hydrogen takes place electrochemically.

16. The method of claim 14, wherein the first stream consists essentially of a hydrocarbon and hydrogen.

17. The method of claim 14, wherein the reactor does not generate electricity and does not need electricity input.

* * * * *